(12) United States Patent
Martens et al.

(10) Patent No.: US 12,006,137 B2
(45) Date of Patent: Jun. 11, 2024

(54) CANOPY AND COMPRESSOR OR GENERATOR INSTALLATION PROVIDED WITH SUCH CANOPY

(71) Applicant: ATLAS COPCO AIRPOWER, NAAMLOZE VENNOOTSCHAP, Wilrijk (BE)

(72) Inventors: Kristof Adrien Laura Martens, Wilrijk (BE); Yanni Francine Dollez, Wilrijk (BE); Walter Josée Louis Adriaenssens, Wilrijk (BE); Steven Ray Maurits Laurent, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 772 days.

(21) Appl. No.: 17/044,537

(22) PCT Filed: Feb. 11, 2019

(86) PCT No.: PCT/IB2019/051074
§ 371 (c)(1),
(2) Date: Oct. 1, 2020

(87) PCT Pub. No.: WO2019/197912
PCT Pub. Date: Oct. 17, 2019

(65) Prior Publication Data
US 2021/0155403 A1 May 27, 2021

Related U.S. Application Data
(60) Provisional application No. 62/656,449, filed on Apr. 12, 2018.

(30) Foreign Application Priority Data
Jul. 18, 2018 (BE) .................................. 2018/5522

(51) Int. Cl.
*B65D 90/20* (2006.01)
*B65D 88/02* (2006.01)
(Continued)

(52) U.S. Cl.
CPC ............. *B65D 90/20* (2013.01); *B65D 88/02* (2013.01); *B65D 90/0026* (2013.01); *B65D 90/008* (2013.01); *H02K 5/04* (2013.01)

(58) Field of Classification Search
CPC ...... B65D 90/20; B65D 88/02; B65D 90/026; B65D 90/008; B65D 90/0086; B65D 88/129; B65D 90/0006; H02K 5/04
(Continued)

(56) References Cited

U.S. PATENT DOCUMENTS 5,762,222 A * 6/1998 Liu .................. B65D 19/12
229/122.25
6,735,917 B1 * 5/2004 Notermann .......... B62D 27/026
52/656.9
2011/0253590 A1 * 10/2011 Lemola ................ B65D 19/18
206/600

FOREIGN PATENT DOCUMENTS

CH 692 738 A5 10/2002
DE 101 55 631 A1 7/2002
(Continued)

OTHER PUBLICATIONS

International Search Report for PCT/IB2019/051074 dated, May 20, 2019 (PCT/ISA/210).
(Continued)

*Primary Examiner* — Rafael A Ortiz
(74) *Attorney, Agent, or Firm* — Sughrue Mion, PLLC

(57) ABSTRACT

A canopy for a compressor or generator installation comprising a chassis (2) with—a base plate (3) comprising a
(Continued)

body with a mounting surface bounded by a polygonal peripheral edge (4); and—a mounting frame (5) containing this base plate (3) and going around the peripheral edge (4); whereby the canopy (1) further comprises a number of corner stays (6), whereby each corner stay (6) is provided with a mounting end which is configured to be mounted onto the chassis (2), whereby at each corner of the peripheral edge (4), at least one corner stay (6) is mounted with its mounting end onto the chassis (2), whereby each corner stay (6) in a mounted state extends from the mounting surface of the base plate (3) in a direction essentially perpendicular to the mounting surface and outwards from the body of the base plate (3), and whereby each corner stay (6) in a mounted state has a free end which is opposite to the mounting end of this corner stay (6) and which is not mounted onto the mounting surface; and whereby the canopy (1) further comprises at least one roof panel (9), characterised in that at each one corner of the peripheral edge (4), the free end of the at least one corner stay (6) is configured to be connected by means of at least one lateral beam (10) to the free end of the at least one corner stay (6) which is mounted at a corner adjacent to said one corner; and that the canopy (1) further comprises a number of lateral beams (10) such that, at each one corner of the peripheral edge (4), the free end of the at least one corner stay (6) at said one corner is connected to the free end of the at least one corner stay (6) which is mounted at a corner adjacent to said one corner.

14 Claims, 3 Drawing Sheets

(51) Int. Cl.
*B65D 90/00* (2006.01)
*H02K 5/04* (2006.01)

(58) Field of Classification Search
USPC .................................................. 206/319, 600
See application file for complete search history.

(56) References Cited

FOREIGN PATENT DOCUMENTS

| | | | |
|---|---|---|---|
| DE | 20 2011 004 004 U1 | 12/2011 | |
| | 754 | | |
| DE | 202011004754 | * 12/2011 | |
| EP | 1 701 109 A2 | 9/2006 | |
| EP | 2 487 429 A1 | 8/2012 | |
| FR | 2 897 927 A1 | 8/2007 | |
| JP | 47-40813 Y1 | 12/1972 | |
| WO | WO-2004041680 A1 * | 5/2004 | ........... B65D 88/524 |
| WO | WO-2011110725 A1 * | 9/2011 | ........... B65D 88/005 |

OTHER PUBLICATIONS

Written Opinion of the International Searching Authority for PCT/IB2019/051074 dated, May 20, 2019 (PCT/ISA/237).
Written Opinion of the International Preliminary Examining Authority for PCT/IB2019/051074 dated, Mar. 3, 2020 (PCT/IPEA/408).
International Preliminary Report on Patentability for PCT/IB2019/051074 dated Jun. 9, 2020 (PCT/IPEA/409).

* cited by examiner

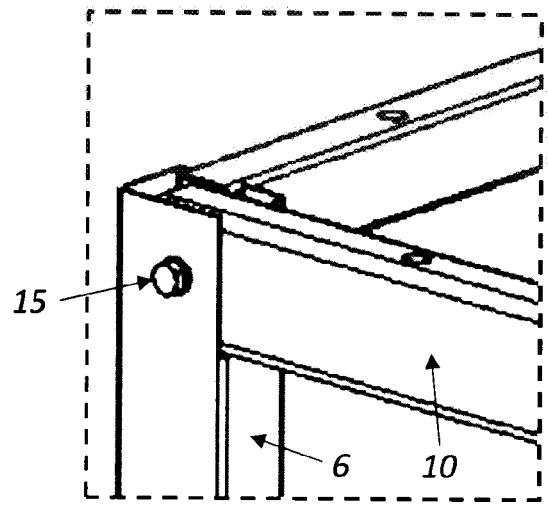
Fig. 5
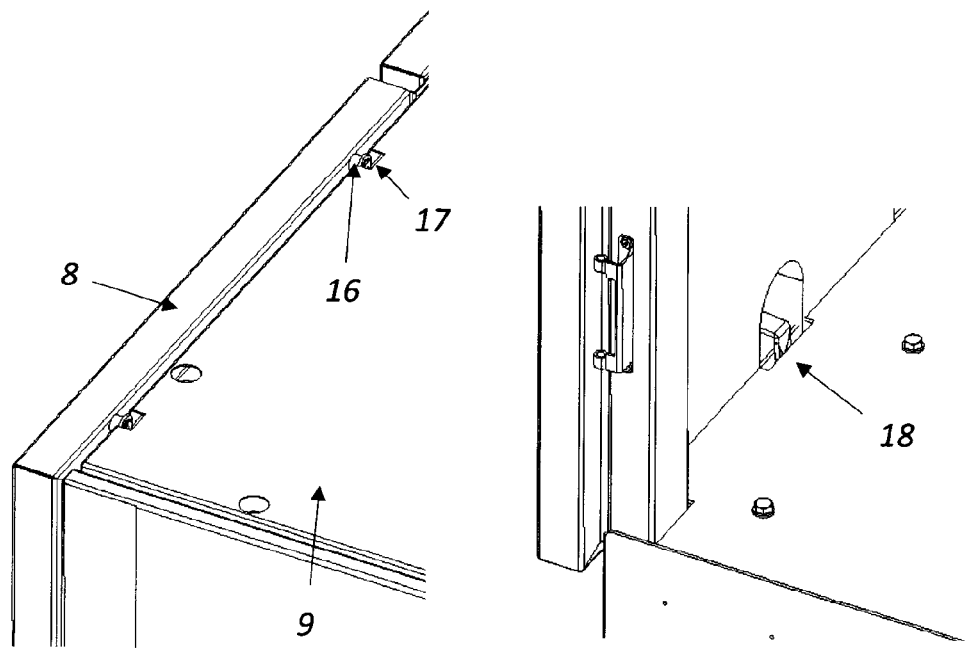
Fig. 6  Fig. 7

CANOPY AND COMPRESSOR OR GENERATOR INSTALLATION PROVIDED WITH SUCH CANOPY

CROSS REFERENCE TO RELATED APPLICATIONS

This application is a National Stage of International Application No. PCT/IB2019/051074 filed Feb. 11, 2019, claiming priority based on U.S. Provisional Application No. U.S. 62/656,449 filed Apr. 12, 2018 and Belgian Patent Application No. BE 2018/5522 filed Jul. 18, 2018.

The present invention concerns a canopy for a compressor or generator installation comprising a chassis with a base plate and a mounting frame onto which a number of corner stays are perpendicularly mounted, whereby each corner stay extends in a same direction from the chassis.

In particular, the invention concerns a canopy comprising a number of lateral beams configured to connect the corner stays at their free end, i.e. the end of the corner stay which is not mounted onto the chassis.

Current canopies for compressors usually comprise a number of corner stays, at least one for each corner of a mounting surface of the base plate of the chassis, and a number of intermediate stays at the edge of the mounting surface and in between the corners of the mounting surface. Both the corner stays and the intermediate stays extend in the same direction from the chassis, perpendicularly on the mounting surface.

Doors of the canopy are usually hinged with hinges at one of their sides on the corner and intermediate stays; usually locks hooking after or into the corner or intermediate stays are placed at the opposite side of this one side with hinges.

Roof panels are mounted onto the corner and intermediate stays. As such, the stays and the roof panels create overall stability and stiffness of the canopy.

The canopy stays and roof panels are also regularly used as fixation points or supporting points for components of the compressor or generator installation, providing for example sideways support for lateral cooling modules by the stays, or may even be replaced by components of the compressor or generator installation, e.g. an electrical cabinet at a corner of the mounting surface of the base plate at least partly replacing the corner stay at that corner.

A first disadvantage of this conventional arrangement is a limited accessibility of the compressor or generator installation, due to obstruction of wider access by the intermediate stays. When wider access is needed, for example in order to take out a compressor element or a motor of the compressor respectively generator installation, these intermediate stays need to be removed, which then also requires removal of the roof panels.

A second disadvantage is a possibly insufficient perpendicular alignment of the stays with the mounting surface of the base plane of the chassis. As the stays are directly mounted onto the mounting surface of the base plane, which has rather wide flatness tolerances, there is a large risk of the stays not being satisfactorily perpendicular to the overall mounting surface.

Additionally, in order to ensure perpendicular alignment of the stays and mechanical stability of the canopy, it is recommended to mount the stays on the mounting surface at several points, for example, by means of a considerable number of bolts, rivets or similar.

Furthermore, when the stays are being used as supporting points for components of the compressor or generator installation or are being replaced by components of the compressor or generator installation, construction quality in terms of alignment and perpendicularity of these components will define the perpendicular alignment of the complete canopy with respect to the mounting surface of the base plate.

In DE 20 2011 004 754 U1, a transportable housing has been described for the accommodation of machines, in particular compressor systems, with wall elements covering the interior of the housing on all sides. Into these wall elements windows and/or doors are used. The transportable housing has a base frame made of support rails designed as a load-bearing element of the housing, at the corners of which corner posts of the housing are detachably fastened and whose surface area is stiffened by stiffening profiles and is covered by a lattice support floor allowing the housing to be picked up by a machine.

The purpose of the present invention is to provide a solution to one or more of the aforementioned and/or other disadvantages.

To this end, the invention concerns a canopy for a compressor or generator installation comprising a chassis with a base plate comprising a body with a mounting surface bounded by a polygonal peripheral edge; and a mounting frame containing this base plate and going around the peripheral edge;

whereby the canopy further comprises a number of corner stays, whereby each corner stay is provided with a mounting end which is configured to be mounted onto the chassis, whereby at each corner of the peripheral edge, at least one corner stay is mounted with its mounting end onto the chassis, whereby each corner stay in a mounted state extends from the mounting surface of the base plate in a direction essentially perpendicular to the mounting surface and outwards from the body of the base plate, and whereby each corner stay in a mounted state has a free end which is opposite to the mounting end of this corner stay and which is not mounted onto the mounting surface; and whereby the canopy further comprises at least one roof panel, with the characteristic that at each one corner of the peripheral edge, the free end of the at least one corner stay is configured to be connected by means of at least one lateral beam to the free end of the at least one corner stay which is mounted at a corner adjacent to said one corner; and that the canopy further comprises a number of lateral beams such that, at each one corner of the peripheral edge, the free end of the at least one corner stay at said one corner is connected to the free end of the at least one corner stay which is mounted at a corner adjacent to said one corner.

An advantage of the canopy according to the invention is that the roof panels of the canopy are supported by the lateral beams instead of intermediate stays, whereby these roof panels and lateral beams do not have to be removed or displaced when large components of the compressor or generator installation need to be accessed or taken out of the canopy.

In a preferred embodiment of the invention, at each one corner of the polygonal peripheral edge of the base plate, the free end of the at least one corner stay at this one corner is configured to be connected by means of lateral beams to the free end of the at least one corner stay at both corners adjacent to this one corner.

This arrangement provides additional lateral beams to the canopy, and hence an improved perpendicular alignment of the corner stays with respect to the mounting surface and additional mechanical stability and stiffness of the overall canopy.

Additional perpendicular alignment of the corner stays and mechanical stability and stiffness of the overall canopy may be achieved by mounting the roof panels onto the lateral beams.

In another preferred embodiment of the invention, each corner of the peripheral edge of the base plate is provided with a mounting hole which is configured to contain the mounting end of the corner stay.

The mounting of the corner stays in mounting holes in the base plate instead of directly onto the mounting surface of the base plate provides the advantage of further mechanical stiffness and stability to the canopy, as the mounting holes can be produced with tight tolerances, such that the perpendicular alignment of the corner stays with respect to the mounting surface of the base plate is better guaranteed.

The corner stays may be detachably mounted to the mounting frame, preferably by means of a bolt connection with a minimum number of bolts, ideally not more than four, preferably not more than three, more preferably not more than two bolts. However, the invention is not limited to detachably mounted corner stays and, more specifically, corner stays that are mounted by means of a bolt connection. Any type of connection may be used to mount the corner stays on the mounting frame, such as a click connection, a glue connection, a rivet connection, etc.

Together the corner stays and the lateral beams make up for a very rigid canopy portal onto which the canopy doors and roof panels are mounted. Doors of the canopy may be configured such that they can be hung at one of their edges onto one of the lateral beams.

Preferably, the doors are configured to be detachably hung onto the lateral beams. In this way, the doors are easily taken off when large components of the compressor or generator installation need to be inspected or removed, creating a maximal opening for internal access to the canopy.

The invention also relates to a compressor or generator installation provided with a canopy comprising a chassis with
  a base plate comprising a body with a mounting surface
    bounded by a polygonal peripheral edge; and
  a mounting frame containing this base plate and going
    around the peripheral edge;
whereby the canopy further comprises a number of corner stays,
whereby each corner stay is provided with a mounting end which is configured to be mounted onto the chassis,
whereby at each corner of the peripheral edge, at least one corner stay is mounted with its mounting end onto the chassis,
whereby each corner stay in a mounted state extends from the mounting surface of the base plate in a direction essentially perpendicular to the mounting surface and outwards from the body of the base plate, and
whereby each corner stay in a mounted state has a free end which is opposite to the mounting end of this corner stay and which is not mounted onto the mounting surface,
with the characteristic that at each one corner of the peripheral edge, the free end of the at least one corner stay is configured to be connected by means of at least one lateral beam to the free end of the at least one corner stay which is mounted at a corner adjacent to said one corner; and
that the canopy further comprises a number of lateral beams such that, at each one corner of the peripheral edge, the free end of the at least one corner stay at said one corner is connected to the free end of the at least one corner stay which is mounted at a corner adjacent to said one corner.

With the intention of better showing the characteristics of the invention, a few preferred embodiments of a canopy for a compressor or generator installation according to the invention comprising a number of lateral beams onto which the at least one roof panel of the canopy is mounted, are described hereinafter by way of example, without any limiting nature, with reference to the accompanying drawings, wherein:

FIG. 5 shows more in detail the part that has been indicated by F5 in FIG. 2;

FIG. 6 shows more in detail the mounting of a door and a roof panel of the canopy according to the invention;

FIG. 7 shows the lock mechanism of a door of the canopy according to the invention.

Figure 1:
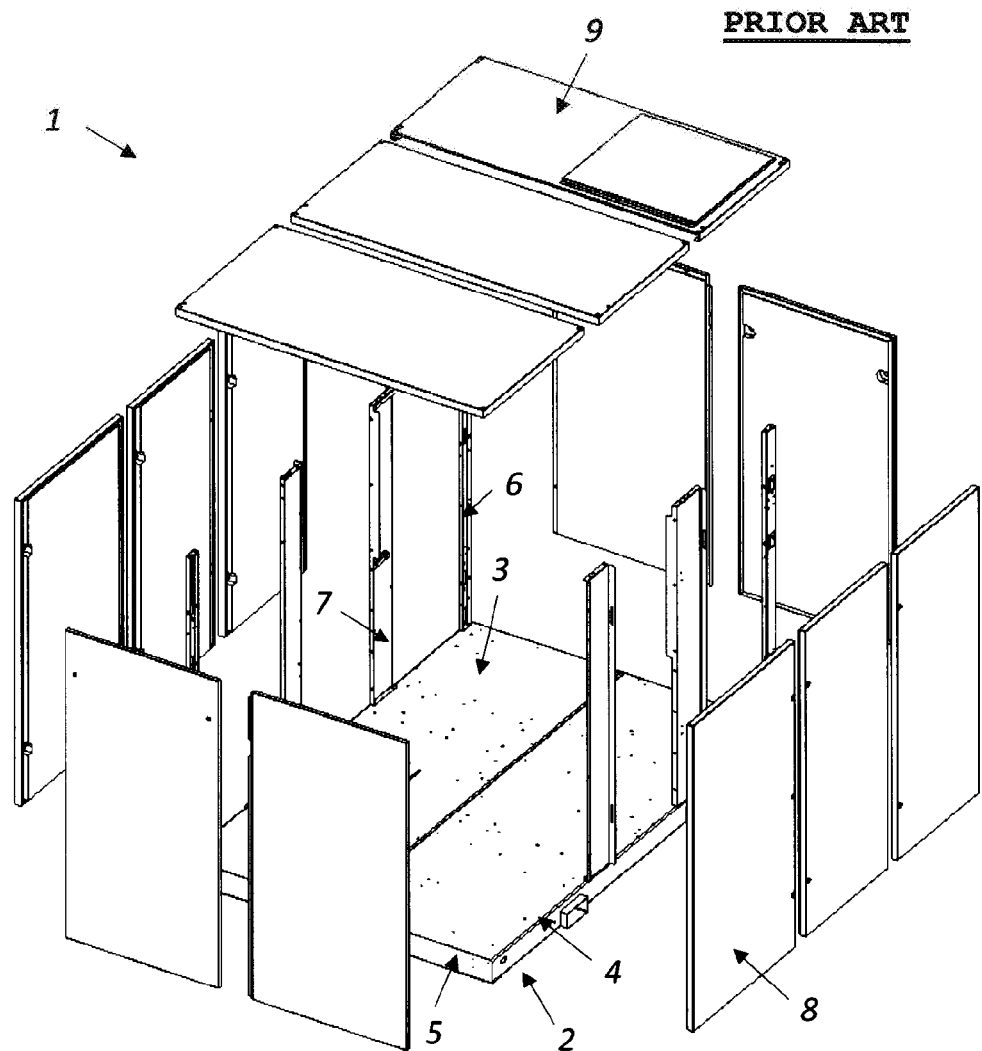
FIG. 1 shows an exploded view of a conventional canopy for a compressor or generator installation.

The conventional canopy 1 in FIG. 1 comprises a chassis 2 with
  a base plate 3 comprising a body with a mounting surface
    bounded by a rectangular peripheral edge 4; and
  a mounting frame 5 containing this base plate 3 and going
    around the rectangular peripheral edge 4,
whereby each corner of the rectangular peripheral edge 4 is provided with a corner stay 6 and whereby intermediate stays 7 are provided at the rectangular peripheral edge 4 in between the corners of the rectangular peripheral edge 4.

The corner stays 6 and the intermediate stays 7 are directly mounted on the base plate 3 of the chassis 2 and all extend in a same direction perpendicular to the mounting surface of the base plate 3 and outwards from the body of the base plate 3.

Doors 8 are hinged on the corner stays 6 and the intermediate stays 7.

Roof panels 9 are mounted onto free ends of the corner stays 6 and the intermediate stays 7. By 'free end' is meant an end of the stay which is opposite to the end of the stay which is mounted onto the mounting surface of the base plate 3 and which is not mounted to the mounting surface of the base plate 3.

Figure 2:
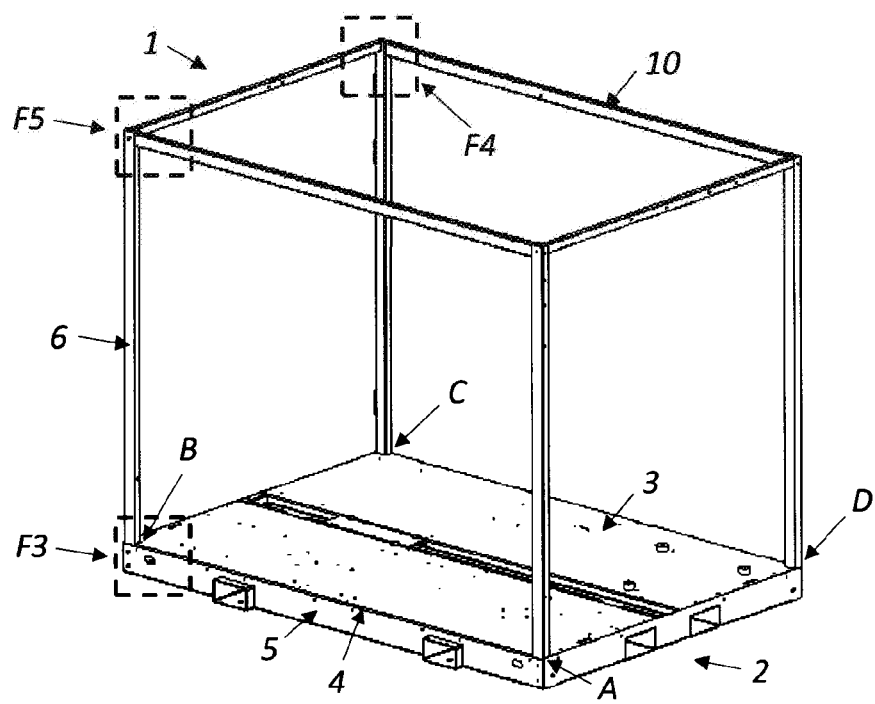
FIG. 2 shows a canopy for a compressor or generator installation according to the invention.

FIG. 2 shows a canopy 1 according to the invention which differs from the conventional canopy 1 of FIG. 1, for example in the fact that no intermediate stays 7 are present and that the free ends of the corner stays 6 are connected by means of lateral beams 10.

In this case, at each one corner of the rectangular peripheral edge 4 of the mounting surface of the base plane 3, the free end of each corner stay 6 is connected to the free end of the corner stays 6 at both corners adjacent to this one corner.

In order to support the roof panels 9, in fact, only the two lateral beams 10 that are connecting the corner stays 6 at corners A and B respectively C and D are strictly necessary to support the roof panels 9. The two lateral beams 10 connecting the corner stays 6 at corners A and D respectively B and C may be included in the canopy 1 to increase the perpendicular alignment of the corner stays 6 with respect to the mounting surface of the base plate 3 and the mechanical stability and stiffness of the canopy 1, but this is not a necessary requirement of the invention.

It is not to be excluded that the peripheral edge 4 of the mounting surface of the base plate 3 has another polygonal shape instead of being rectangular, for example an L-shape.

Figure 3:
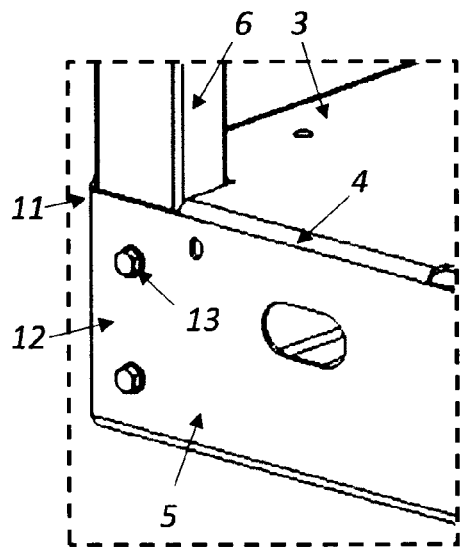
FIG. 3 shows more in detail the part that has been indicated by F3 in FIG. 2.

FIG. 3 shows in more detail the mounting of one of the corner stays 6 onto the chassis 2 of the canopy 1. The base plate 3 is at each corner of its peripheral edge 4 provided with a mounting hole 11 which is configured to contain a mounting end of the corner stay 6.

The corner stay 6 may be detachably mounted with its mounting end onto the mounting frame 5 of the chassis 2. This detachable mounting may be established by means of a bolt connection 12 comprising a minimum number of bolts 13, in this case only two.

Figure 4:
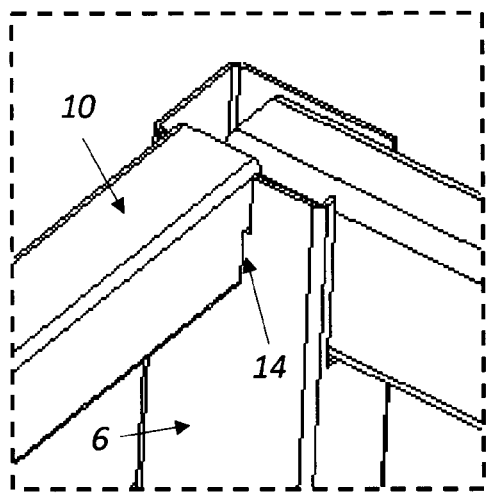
FIG. 4 shows more in detail the part that has been indicated by F4 in FIG. 2.

FIG. 4 shows in more detail the mounting of lateral beams 10 onto the free end of one of the corner stays 6 of the canopy 1. The corner stay 6 is configured such that the lateral beams 10 snap in this corner stay 6, for example, by means of a groove 14 in the lateral beam 10.

Preferably, the lateral beam 10 may be fastened to the corner stay 6, for example, by means of a click connection, a glue connection, a rivet connection, etc. More preferably, the lateral beams 10 may be detachably attached to the corner stay 6, for example, by means of a bolt 15, as indicated in FIG. 5.

FIG. 6 shows in more detail the mounting of a door 8 and a roof panel 9 onto the lateral beams 10 of the canopy 1. The door 8 is hung on one of the lateral beams 10 by means of at least two knobs 16 which protrude at a same edge on a side of the door 8 whose edges in a hung state of the door 8 are tangent to an internal space contained by the canopy 1. By this 'internal space' is meant a polyhedral space that is bounded by the base plate 3, the corner stays 6, and the lateral beams 10. The knobs 16 are configured such that the door 8 is hung onto this lateral beam 10 by means of these knobs 16, at the edge of the door 8 at which these knobs 16 are provided.

The roof panel 9 is mounted onto the lateral beams 10 and comprises at least two recesses 17 containing the knobs 16 of the door 8, at least one recess 17 for each knob 16.

The door 8 may be detached from the lateral beam 10 and the canopy 1 by lifting the door 8 with the knobs 16 from the recesses 17 and then moving the edge of the door 8 which is provided with the knobs 16 away from the canopy 1.

Doors 8 may be placed sequentially next to each other, hung onto the lateral beams 10, to close off the lateral sides of the canopy 1. By 'lateral sides' is meant the sides of the canopy 1 which two-by-two share one of the corner stays 6 as a common edge.

An additional lateral beam 10, which is not necessarily needed to support the roof panels 9, may be specifically incorporated into the canopy 1 to provide a lateral side of the canopy 1 at a desired and/or required position with one or more doors 8, which are then hung onto this additional lateral beam 10.

FIG. 7 shows in more detail a lock mechanism 18 of the door 8 which is provided at an edge of the door 8 which is opposite to the edge at which the door 8 is hung onto the lateral beam 10.

It is not excluded that the door 8 can be hooked onto the chassis 2 by means of a mortise and tenon connection, whereby the door 8 or the chassis 2 comprises a protruding tenon which corresponds to a mortise in the chassis 2 respectively the door 8, and can be locked onto one of the lateral beams 10 by means of the lock mechanism 18. In other words, the position of the lock mechanism 18 and the knobs 16 respectively the mortise and tenon connection may be interchanged on the door 8.

The present invention is by no means limited to the embodiments described as an example and shown in the drawings, but a canopy for a compressor or generator installation according to the invention and a compressor or generator installation provided with such canopy can be realised in all kinds of forms or dimensions without departing from the scope of the invention.

The invention claimed is:

1. A canopy for a compressor or generator installation including a chassis (2), comprising:
   a base plate (3) comprising a body with a mounting surface bounded by a polygonal peripheral edge (4);
   a mounting frame (5) containing the base plate (3) and extending around the peripheral edge (4) and including a plurality of corners;
   a plurality of corner stays (6), each corner stay (6) being provided with a mounting end mounted onto the chassis (2) at each of the corners of the peripheral edge and extending upwardly from and perpendicular to the mounting surface, and further being provided with a free end opposite to the mounting end;
   a roof panel supported by the free end of each of the corner stays;
   a plurality of horizontal lateral beams (10) respectively connected to the free end of adjacent corner stays (6) by snapping into a groove (14) in the lateral beam (10); and
   a door (8) detachably hung directly from one of the horizontal lateral beams (10).

2. The canopy according to claim 1, wherein at each one corner of the peripheral edge (4) of the base plate (3), the free end of the one corner stay (6) at one corner is connected to the free end of the corners stays at both corners adjacent to said one corner.

3. The canopy according to claim 1, wherein the roof panel (9) is mounted onto the lateral beams (10).

4. The canopy according to claim 1, wherein each corner of the peripheral edge (4) of the base plate (3) is provided with a mounting hole (11) which contains the mounting end of the corner stay (6).

5. The canopy according to claim 1, wherein the mounting end of each corner stay (6) is configured to be detachably mounted onto the mounting frame (5).

6. The canopy according to claim 5, wherein the mounting end of each corner stay (6) is configured to be detachably mounted onto the mounting frame (5) by means of a bolt connection (12).

7. The canopy according to claim 6, wherein the bolt connection (12) comprises maximally four bolts (13).

8. The canopy according to claim 1, wherein the free end of the corner stay (6) is configured such that the lateral beam (10) can be detachably attached to the corner stay (6).

9. The canopy according to claim 8, wherein the free end of the corner stay (6) is configured such that the lateral beam (10) can be detachably attached to the corner stay (6) by means of a bolt (15).

10. The canopy according to claim 1, wherein the door (8) is hung onto the one of the lateral beams (10) by means of at least two knobs (16) which are provided at said edge of the door (8), on a side of the door (8) whose edges in a hung state of the door (8) are all tangent to an internal space of the canopy (1).

11. The canopy according to claim 10, wherein for each one of the at least two knobs (16), the roof panel (9) comprises at least one recess (17) which is configured to contain the one of the at least two knobs (16).

12. The canopy according to claim 1, wherein the door (8) includes a lock mechanism (18) at an edge that is opposite to the edge at which the door (8) is hung onto the one of the lateral beams (10).

13. A compressor or generator installation provided with a canopy (1) according to claim 1.

14. A canopy for a compressor or generator installation including a chassis (2), comprising:
- a base plate (3) comprising a body with a mounting surface bounded by a polygonal peripheral edge (4);
- a mounting frame (5) containing the base plate (3) and extending around the peripheral edge (4) and including a plurality of corners;
- a plurality of corner stays (6), each corner stay (6) being provided with a mounting end mounted onto the chassis (2) at each of the corners of the peripheral edge and extending upwardly from and perpendicular to the mounting surface, and further being provided with a free end opposite to the mounting end;
- a roof panel supported by the free end of each of the corner stays;
- a plurality of horizontal lateral beams (10) respectively connected to the free end of adjacent corner stays (6); and
- a door (8) hung directly from one of the horizontal lateral beams (10), wherein the door (8) is hung onto the one of the lateral beams (10) by means of at least two knobs (16) which are provided at said edge of the door (8), on a side of the door (8) whose edges in a hung state of the door (8) are all tangent to an internal space of the canopy (1), and wherein for each one of the at least two knobs (16), the roof panel (9) comprises at least one recess (17) which is configured to contain the one of the at least two knobs (16).

* * * * *